United States Patent Office 2,776,889
Patented Jan. 8, 1957

2,776,889

FORTIFIED ANIMAL FEEDS

John H. Standen, Cleveland Heights, Ohio, assignor to The B. F. Goodrich Company, New York, N. Y., a corporation of New York No Drawing. Application March 26, 1954,
Serial No. 419,086

14 Claims. (Cl. 99—2)

This invention relates to new and useful improvements in prepared feeds for animals, that is, for animals living largely on plant products, and more particularly to blended feed rations for domestic farm animals, which prepared feeds contain ingredients that enable young farm animals to make more efficient use of the feed and hence to increase in weight on less feed, or to gain weight at a faster rate, during the first weeks or months of their existence.

The purpose of this invention is to provide an animal feed which will stimulate and accelerate the growth of farm animals, such as chicks, poults, pigs, calves, colts, lambs, etc., in order to bring them to maturity in a shorter than normal time, and in those cases in which it is customary to prepare for the market the flesh of such animals prior to their full growth, to bring such animals to a marketing condition in a minimum time and at a maximum weight. Another purpose of this invention is to increase the feed efficiency of prepared feeds so that the growth in young farm animals may be attained with a smaller amount of feed. Normally, the animal feeds of this application produce both a higher feed efficiency and an acceleration in growth, and hence are herein generically designated "growth-stimulated animal feeds."

A further purpose of this invention is to stabilize growth-stimulated animal feeds against change prior to the feeds being consumed, and particularly to minimize objectionable oxidation of any of the constituents of animal feeds, so that a maximum nutritional value of the fortified feeds is made available for the growth of young farm animals.

The present invention is based on the discovery that certain substances are capable of imparting to animal feeds a stability against chemical change prior to feeding and a property that causes young animals that are fed with the stabilized growth-stimulated feeds to grow and to mature faster from the time the young animals are able to eat ground solid food or mash, or to make more economical use of such feeds, or both.

There are a wide variety of basal rations being offered on the market for the feeding of farm animals, but there is no universally accepted basal ration formula. Literally, thousands of basal ration formulae are in daily use. The National Research Council released in 1950 recommended minimum nutrient allowances for the early life stages of chicks, poults, pigs, calves, lambs and other farm animals, which nutrients, both in kind and in quantity, are not arbitrarily fixed but are intended to be varied with considerable latitude based on the experience of the producer and user of such feeds.

In order to make preeminently clear what is meant by the term "animal feed," the following is given by way of illustration of a basal ration:

Two classes of nutrients are normally constituents of any basal ration of animal feeds and are here referred to as A. Essential constituents, which comprise two classes of nutrients, both of which are recognized as necessary in any basal ration of animal feeds, all such approved basal feeds contain ingredients selected from each of these two classes:

1. Plant ingredients which normally constitute from 85% to as high as 95% by weight of the basal ration and include one or more of the following: corn meal, soybean oil meal, wheat bran, wheat middlings, dehydrated alfalfa meal, ground oats and oat grouts, millet, linseed oil meal, cocoanut oil meal, distillers' dried grains, and the like ground plant products;

2. Mineral ingredients which are normally incorporated in the feed in very small amounts of around 1 to 5% by weight of the basal ration and include one or more of the following: salts of calcium, phosphorous, manganese, and common salt, as well as minute proportions of one or more of the salts of iodine, potassium, magnesium, iron, copper, and the like.

B. Ancillary constituents, which are optionally added to animal feeds and are alleged to impart to the feeds to which they are added higher nutritional values, and which are here classified as 3. Animal ingredients, which may comprise up to as high as 10% by weight of the basal ration, although used normally in much smaller amounts, and include fish meal, ground meat scraps, animal fats, dried whey solubles and the like, although it is to be understood that many highly recommended animal feeds contain only minute or no animal ingredients;

4. Vitamin ingredients, which are added to some but not all basal rations in small amounts and include one or more of the vitamins A, $B_{12}$, D and K, as well as materials containing the B vitamins, such as riboflavin, niacin, pantothenic acid or salts thereof, choline, pyridoxine, thiamine, nicotinic acid or salts thereof, biotin, folic acid and the like; and 5. Amino acid ingredients, which are sometimes, but not generally, added to animal feeds in very small amounts and include methionine, phenylalanine, arginine, glycine, histidine, isoleucine, leucine, lysine, threonine, tryptophan, valine and the like.

The term "animal feed" as used in the specification and claims of this application is to be understood to include any basal ration containing ingredients as hereabove described.

As has been stated above, the purpose of this invention is to provide an animal feed which will stimulate the growth of young farm animals. This result is accomplished by utilizing certain substances to impart to the basal ration a property that causes young animals to utilize feed rations more efficiently or to grow and mature faster from the time the young animals are able to eat ground solid food or mash. These substances include some of the simple substituted indoles, such as 2,3-diphenyl indole, and 2,3-ditolyl indole, and the organic substituted indoles such as 5-methoxy-2,3-diphenyl indole, 2-methyl indole, and 2,3-dimethyl indole. These indoles, when added to an animal feed, as above defined, impart to that feed a capacity to stimulate growth as compared with the animal feed without the indole compounds. For convenience and brevity in description, all such indole compounds as are hereinabove recited are collectively referred to as "indole growth stimulants."

Certain feed stabilizers have also been found to impart to animal feeds fortified with substituted indoles increased growth-stimulating properties. Among these feed stabilizers are some of the substituted diphenyl amines, such as diphenyl-para-phenylene diamine, iso-propoxy-diphenylamine, para-hydroxy-diphenylamine, as well as 6-ethoxy-2,2,4-trimethyl-1,2-dihydroquinoline, di-beta-naphthyl-para-phenylene diamine, and aldol alpha-naphthylamine. For convenience, all such amine stabilizers as are hereinabove recited are collectively referred to as "amine growth stimulants."

It will be understood that these stimulants, both the indole and the amine, are to be intimately and uniformly distributed throughout the basal ration in which they are used. The pulverulent stimulants, such as 2,3-diphenyl indole and diphenyl-para-phenyl diamine, may be premixed in powder form into one, or a part of one, of the finely divided solid ingredients, such as the meals, salts, etc. of the basal ration, or, the indole stimulant may be premixed with one of the finely divided ingredients and the amine stimulant with another. By thus master batching the stimulants so as to secure intimate and uniformly dispersed batches of stimulants, and then thoroughly intermixing all the ingredients, a satisfactorily uniform dispersion of the stimulants throughout the fortified feed is obtained. Alternatively, where it is desired to add the stimulants in a liquid form to a basal ration, they may be dissolved or dispersed thoroughly in a liquid medium, preferably an inert liquid medium, which may be a liquid constituent of the basal ration, or a mineral oil or inert solvent or the like, and then to spray disperse over and/or intimately mix into the animal feed to be fortified, or, spray disperse and/or intimately premix into one of the finely divided ingredients of the animal feed, which is later added to and premixed with the other ingredients.

In a preferred form of the invention, any one or more of the indole growth stimulants with or without one or more of the amine growth stimulants is added in minor proportions to an animal feed, as above defined, to produce the new and improved growth-stimulated animal feed of this application. Where feeds are stored for long periods, or in moist or hot climates, it has been found to be beneficial to add to such animal feeds a minor proportion of each of an indole growth stimulant and an amine growth stimulant, since the two produce superior results where storage conditions tend to cause deterioration of any of the ingredients of the animal feeds.

In the examples which follow, two or more groups of animals are selected, each group being diversified as to weight, sex, breed and other characteristics so that the animals of each group are at the start of the same average weight and have the same number of each sex, breed, etc. To one group is fed a basal ration of high nutrient value, above that recommended by the National Research Council, and to the other group is fed the same basal ration containing an indole growth stimulant with or without the amine growth stimulant added. Satisfactory results are obtained where the indole growth stimulant is added to the animal feed in proportions ranging from 1 to 10 grams per ton of the animal feed, and where the amine growth stimulant is added to the animal feed in proportions ranging from 0.01% to 0.2% of the weight of the animal feed. Since optimum results are obtained within the ranges here noted, higher proportions are not recommended, as such use would be wasteful and hence uneconomical. However, any such higher proportions are to be considered to be within the scope of this invention.

EXAMPLE 1

In feeding tests made under exacting technical control, the efficacy of the indole growth stimulants is demonstrated by the results obtained with chickens. The following basal ration was employed.

| Basal Ration Formula A: | | |
|---|---|---|
| 1. Plant Ingredients— | | |
| Ground yellow meal | 530 lbs. | }950 lbs. |
| Soybean oil meal | 420 lbs. | |
| 2. Mineral Ingredients— | | |
| Defluorinated rock phosphate | 31 lbs. | |
| Ground limestone | 15 lbs. | } 51.17 lbs. |
| Mineralized salt | 5 lbs. | |
| Manganese sulfate | 0.17 lbs. | |
| 3. Animal Ingredients | | None. |
| 4. Vitamin Ingredients (approx. 3.556 kg.)— | | |
| Vitamin D—1,500 units/gm | 150 gm. | |
| Vitamin A—20,000 units/gm | 50 gm. | |
| Riboflavin—1 gm./oz | 24 gm. | |
| Calcium pantothenate—2 gm./oz | 19.5 gm. | }7.7 lbs. |
| Choline chloride—25% pure | 1,040 gm. | |
| Niacin (pure) | 5 gm. | |
| Vitamin B¹²—12 mg./lb | 0.5 lb. | |
| 5. Amino Acid Ingredient— | | |
| Methionine | 1 lb. | 1 lb. |
| Total Weight Basal Ration (approx.) | | 1,009.87 lbs. |

Utilizing the feed of the above basal ration formula and 2,3-diphenyl indole as the growth stimulant, one group of day-old chicks was fed the above described Basal Ration Formula A, without the growth stimulant, and another group of day-old chicks was fed the Basal Ration Formula A, to which 4.5 grams per ton of 2,3-diphenyl indole had been added. A summary of the results is shown in the table below:

*Table I*

| | Average Weight in Grams | | | |
|---|---|---|---|---|
| | 1 day | 4 wks. | 6 wks. | 8 wks. |
| 1. Basal Diet without Indole Growth Stimulant | 40 | 411 | 718 | 1,024 |
| 2. Basal Diet with Indole Growth Stimulant | 40 | 459 | 824 | 1,172 |
| Increased Growth | | 48 | 106 | 148 |

EXAMPLE 2

Again utilizing the above basal ration of Formula A, one group of chicks was fed the basal ration, which had been in storage for six months, without any growth stimulant and a second group of chicks was fed the same basal ration to which had been added at the time of making up the ration 4.5 grams per ton of 2,3-diphenyl indole and 0.10% by weight of diphenyl-para-phenylene-diamine.

*Table II*

| | Average Weight in Grams | | | |
|---|---|---|---|---|
| | 1 day | 4 wks. | 6 wks. | 8 wks. |
| 1. Basal Diet without Growth Stimulant | 40 | 390 | 694 | 920 |
| 2. Basal Diet with Growth Stimulant | 40 | 462 | 822 | 1,174 |
| Increased Growth | | 72 | 128 | 254 |

EXAMPLE 3

A test similar to that of Example 1, but utilizing another standard basal formula, corroborated the results of Example 1.

| Basal Ration Formula B: | | |
|---|---|---|
| 1. Plant Ingredients— | | |
| Corn meal | 46.5 lbs. | |
| Standard middlings | 15 lbs. | |
| Soybean oil meal | 27.5 lbs. | 91.5 lbs. |
| Alfalfa meal | 2.5 lbs. | |
| 2. Mineral Ingredients— | | |
| Limestone | 1.0 lbs. | |
| Salt | 0.5 lb. | 1.5 lbs. |
| Manganese sulfate | 11.35 gms. | |
| 3. Animal Ingredients— | | |
| Fish oil meal | 2.5 lbs. | 5.0 lbs. |
| Bone meal | 2.5 lbs. | |
| 4. Vitamin Ingredients (approx. 1054.9 gm.)— | | |
| A and D oil (2,000 A and 400 D) | 10.7 gm. | |
| Choline chloride | 128.0 gm. | 2.0 lbs. |
| Niacin | 900.0 gm. | |
| Riboflavin (8,000) | 16.2 gm. | |
| 5. Amino Acid Ingredients | | None. |
| Total Weight Basal Ration (approx.) | | 100.0 lbs. |

Utilizing the above basal ration, Formula B, and 2,3-diphenyl indole as a growth stimulant, and 16 chicks in each group of the same average weight (39 gms.), one group was fed the basal ration without the growth stimulant and the other group was fed the basal ration with 3 grams per ton of the growth stimulant. A summary of results is shown in the table below:

Table III

| | Average Weight in Grams | | | |
|---|---|---|---|---|
| | 1 day | 4 wks. | 6 wks. | 8 wks |
| 1. Basal Diet without Growth Stimulant | 39 | 383 | 659 | 964 |
| 2. Basal Diet with Growth Stimulant | 39 | 433 | 773 | 1,116 |
| Increased Growth | | 50 | 114 | 152 |

EXAMPLE 4

The percentage range of indole growth stimulant producing satisfactory results is indicated in the following table, based on Basal Ration Formula A and 2,3-diphenyl indole in the amounts indicated:

Table IV

| | Average Weight in Grams | | | |
|---|---|---|---|---|
| | 4 wks. | 6 wks. | 8 wks. | 10 wks. |
| 1. Basal Diet without Growth Stimulant | 411 | 718 | 1,024 | 1,388 |
| 2. Basal Diet with Growth Stimulant: | | | | |
| a. 2 gm./ton | 415 | 742 | 1,064 | 1,448 |
| b. 4.5 gm./ton | 425 | 760 | 1,072 | 1,452 |
| c. 9 gm./ton | 413 | 737 | 1,060 | 1,446 |

It will be noted that the addition of 2,3-diphenyl indole in ratio of 2 gm./ton to 9 gm./ton to the basal ration produces an increase in the rate of growth and that 4.5 gm./ton produces the maximum growth effect. The other indole growth stimulants likewise are effective within the same range.

EXAMPLE 5

The relative value of the several indole growth stimulants on chickens fed on Formula A above is shown in the following table, in which "a" represents 2,3-diphenyl indole, "b" 2,3-ditolyl indole, "c" 2-methyl indole, "d" 2,3-dimethyl indole, and "e" 5-methoxy-2,3-diphenyl indole:

Table V

| | Average Weight in Grams | | |
|---|---|---|---|
| | 4 wks. | 6 wks. | 8 wks. |
| 1. Basal Diet without Growth Stimulant | 383 | 659 | 964 |
| 2. Basal Diet with Growth Stimulant: | | | |
| a | 422 | 738 | 1,073 |
| b | 397 | 701 | 1,033 |
| c | 433 | 773 | 1,116 |
| d | 424 | 733 | 1,068 |
| e | 427 | 749 | 1,082 |

Similar beneficial growth properties were imparted to animal feeds for pigs, calves and lambs.

EXAMPLE 6

The indole growth stimulants accelerate the growth of baby pigs which are placed on a basal diet after weaning, as when two days old. One group of pigs is fed the basal diet without the indole growth stimulant and two groups are fed the basal diet with 4 grams per ton and 7 grams per ton of indole growth stimulant, respectively. The average daily gain of one pound per day for the eight weeks period is a remarkable growth for pigs of this age. The following table indicates the response of baby pigs to the indole growth stimulants:

Table VI

| | Average Weight | | |
|---|---|---|---|
| | Initial Wt., kg. | Wt. End 8 wks., kg. | Daily Gain, lb. |
| 1. Basal Diet without Growth Stimulant | 1.81 | 20.40 | 0.73 |
| 2. Basal Diet with Growth Stimulant: | | | |
| a. 4 gm./ton | 1.76 | 26.40 | 0.97 |
| b. 7 gm./ton | 1.78 | 28.20 | 1.06 |
| Average a and b | 1.77 | 27.30 | 1.015 |

EXAMPLE 7

The growth of baby lambs is also accelerated by the addition of indole growth stimulants to a basal ration as compared to lambs fed on the basal ration alone, as is indicated in the following table:

Table VII

| | Average Weight in Pounds | | |
|---|---|---|---|
| | Initial Weight | Wt. End 14 days | Daily Gain |
| 1. Basal Diet without Growth Stimulant | 58.66 | 65.94 | 0.52 |
| 2. Basal Diet with 4 gm./ton Growth Stimulant | 58.30 | 71.74 | 0.96 |

It is to be understood that the above examples are to be taken as illustrative only, and not in limitation, of the invention of this application which is directed broadly to animal feeds to which an indole growth stimulant together if desired with an amine growth stimulant, is added in minor proportions.

What is claimed is:

1. The method of increasing the feed efficiency of a basal ration of an animal feed which comprises intimately and uniformly dispersing throughout the basal ration an effective quantity of an indole growth stimulant selected from a class consisting of 2,3-diphenyl indole, 2,3-ditolyl indole, 5-methoxy-2,3-diphenyl indole, 2-methyl indole and 2,3-dimethyl indole.

2. The method of increasing the feed efficiency of a basal ration of animal feed which comprises intimately and uniformly dispersing throughout the basal ration an effective quantity of an indole growth stimulant comprising 2,3-diphenyl indole.

3. The method of increasing the feed efficiency of a basal ration of an animal feed which comprises intimately and uniformly dispersing throughout the basal ratio an effective quantity of an indole growth stimulant comprising 5-methoxy-2,3-diphenyl indole.

4. The method of increasing the feed efficiency of a basal ration of an animal feed which comprises intimately and uniformly dispersing throughout the basal ration an effective quantity of an indole growth stimulant comprising 2-methyl indole.

5. The method of increasing the feed efficiency of a basal ration of an animal feed which comprises intimately and uniformly dispersing throughout the basal ratio an effective quantity of an indole growth stimulant selected from a class consisting of 2,3-diphenyl indole, 2,3-ditolyl indole, 5-methoxy-2,3-diphenyl indole, 2-methyl indole and 2,3-dimethyl indole, and an amine stabilizer selected from a class consisting of diphenyl-para-phenylene diamine, iso-proxpoxy-diphenylamine, para-hydroxy-diphenylamine, di-beta-naphthyl-para-phenylene diamine, aldol alpha-naphthylamine, and 6-ethoxy-2,2,4-trimethyl-1,2-dihydroquinoline.

6. The method of increasing the feed efficiency of a basal ration of animal feed which comprises intimately and uniformly dispersing throughout the basal ration an effective quantity of an indole growth stimulant comprising 2,3-diphenyl indole, an amine stabilizer selected from a class consisting of diphenyl-para-phenylene diamine, iso-proxpoxy-diphenylamine, and para-hydroxy-diphenylamine.

7. The method of increasing the feed efficiency of a basal ration of an animal feed which comprises intimately and uniformly dispersing throughout the basal ration an effective quantity of an indole growth stimulant comprising 2,3-diphenyl indole, an amine stabilizer comprising diphenyl-para-phenylene diamine.

8. A prepared animal feed fortified to increase the efficiency in the utilization of the nutrients consumed by young animals which contains an effective quantity of a growth stimulant selected from a class consisting of 2,3-diphenyl indole, 2,3-ditolyl indole, 5-methoxy-2,3-diphenyl indole, 2-methyl indole and 2,3-dimethyl indole.

9. A prepared animal feed fortified to increase the efficiency in the utilization of the nutrients consumed by young animals which contains an effective quantity of a growth stimulant comprising 2,3-diphenyl indole.

10. A prepared animal feed fortified to increase the efficiency in the utilization of the nutrients consumed by young animals which contains an effective quantity of a growth stimulant comprising 5-methoxy-2,3-diphenyl indole.

11. A prepared animal feed fortified to increase the efficiency in the utilization of the nutrients consumed by young animals which contains an effective quantity of a growth stimulant comprising 2-methyl indole.

12. A prepared animal feed fortified to increase the efficiency in the utilization of the nutrients consumed by young animals which contains an effective quantity of a growth stimulant selected from a class consisting of 2,3-diphenyl indole, 2,3-ditolyl indole, 5-methoxy-2,3-diphenyl indole, 2-methyl indole and 2,3-dimethyl indole, and an amine stabilizer selected from a class consisting of diphenyl-para-phenylene diamine, iso-proxpoxy-diphenylamine, para-hydroxy-diphenylamine, di-beta-naphthyl-para-phenylene diamine, aldo alpha-naphthylamine, and 6-ethoxy-2,2,4-trimethyl-1,2-dihydroquinoline.

13. A prepared animal feed fortified to increase the efficiency in the utilization of the nutrients consumed by young animals which contains an effective quantity of a growth stimulant comprising 2,3-diphenyl indole, and an amine stabilizer selected from a class consisting of diphenyl-para-phenylene diamine, iso-proxpoxy-diphenylamine, and para-hydroxy-diphenylamine.

14. A prepared animal feed fortified to increase the efficiency in the utilization of the nutrients consumed by young animals which contains an effective quantity of a growth stimulant comprising 2,3-diphenyl indole, and an amine stabilizer comprising diphenyl-para-phenylene diamine.

References Cited in the file of this patent
UNITED STATES PATENTS

| | | |
|---|---|---|
| 2,510,428 | Standen | June 6, 1950 |
| 2,522,854 | Brink et al. | Sept. 19, 1950 |